United States Patent [19]
Joffe

[11] Patent Number: 5,524,499
[45] Date of Patent: Jun. 11, 1996

[54] ROTATING DRIVE MAGNETICALLY COUPLED FOR PRODUCING LINEAR MOTION

[76] Inventor: Benjamin Joffe, 22314 James Alan Cir., Chatsworth, Calif. 91311

[21] Appl. No.: 279,551

[22] Filed: Jul. 25, 1994

Related U.S. Application Data

[63] Continuation of Ser. No. 952,471, Sep. 28, 1992, Pat. No. 5,331,861, which is a continuation of Ser. No. 532,743, Jun. 4, 1990, abandoned.

[51] Int. Cl.⁶ .................................................. F16H 25/20
[52] U.S. Cl. ........................ 74/89.15; 74/424.8 R
[58] Field of Search .................... 74/89.15, 424.8 R, 74/441; 384/446, 615

[56] References Cited

U.S. PATENT DOCUMENTS

| | | | |
|---|---|---|---|
| 3,011,842 | 12/1961 | Norris | 384/446 |
| 3,016,274 | 1/1962 | Norris | 384/446 |
| 3,974,706 | 8/1976 | Danko, Jr. | 74/89.15 |
| 4,131,029 | 12/1978 | Harbaugh et al. | 74/89.15 |
| 4,372,223 | 2/1983 | Iwatani | 74/89.15 X |
| 4,597,303 | 7/1987 | Nakaya | 74/89.15 |
| 4,779,473 | 10/1988 | Grady et al. | 74/424.8 R X |

*Primary Examiner*—Richard M. Lorence
*Attorney, Agent, or Firm*—Ashen & Lippman

[57] ABSTRACT

A mechanism to linearly drive an object has a driven member and a magnetic coupling—with first and second mutually facing elements which transmit longitudinal force but allow relative lateral motion that may be translational or rotational. In one form of the device a flange extends from one element, along a direction including a longitudinal component, to engage— through the intermediary of a set of balls—a surface on the other element. The surface and flange cooperate to constrain the two elements against relative lateral motion in at least one direction. Magnetic fields clamp the balls between the flange and surface, to eliminate play perpendicular to the surface, and permit relative motion parallel to the surface. Two stages in series transmit torque through the system but absorb transverse translational wobble. Another form of the device also absorbs transverse rotational wobble: instead of flange and surface, the coupling has two curved surfaces (which may be cylindrical or spherical) and balls between them. A driving member can be added, moving the driven member longitudinally when the driving member rotates; either is elongated.

19 Claims, 10 Drawing Sheets

ROTATING DRIVE MAGNETICALLY COUPLED FOR PRODUCING LINEAR MOTION

This is a continuation of application Ser. No. 07/952,471, filed on Sep. 28, 1992, and issued on Jul. 26, 1994, as U.S. Pat. No. 5,331,861; which is a continuation of application Ser. No. 07/532,743, filed Jun. 4, 1990, and now abandoned.

BACKGROUND OF THE INVENTION

In various applications it is necessary to repetitively produce linear movements. Both precision and wear factors are very important. One type of mechanism that is widely used converts rotary motion into longitudinal, reciprocating motion. For example, the lead screw has been known and used for this purpose for many decades.

In more recent times, the conventional lead screw is often replaced by a ball screw, in which balls positioned between a screw member and a ball housing provide rolling friction in lieu of the pure sliding friction that would result from the operation of the conventional lead screw. Another mechanism for converting rotary motion into linear motion of a reciprocating nature is known as the linear friction driver.

In both of those devices there is a problem which adversely affects operating precision. The problem is that the lead screw—or an equivalent elongated drive member, the shaft of a linear friction driver—experiences lateral deflection at one or more points along its length, thus producing a wobbling or vibrating action during its rotation. The wobble or vibration, in turn, causes small but significant errors in the work process being performed.

Wobble in drive mechanisms can have both translational and rotational components. It is a problem in many types of drives, including the rotary-to-linear converters mentioned above.

PRIOR ART

Pertinent prior art includes the following U.S. patents:

Cunningham, U.S. Pat. No. 2,916,931

Bourne, U.S. Pat. No. 3,001,414

Norris, U.S. Pat. No. 3,011,842

Norris, U.S. Pat. No. 3,016,274

Paine (NASA), U.S. Pat. No. 3,660,704

Hoshina et al., U.S. Pat. No. 3,777,587

Stegeman et al., U.S. Pat. No. 3,824,420

Imahashi, U.S. Pat. No. 4,347,452

U.S. Pat. No. 4,487,087

The Norris patents disclose magnetic bearings. The other prior patents show devices for eliminating or reducing backlash in machine drives, and also show magnetic controls of various kinds used in conjunction with machinery.

Figure 1:
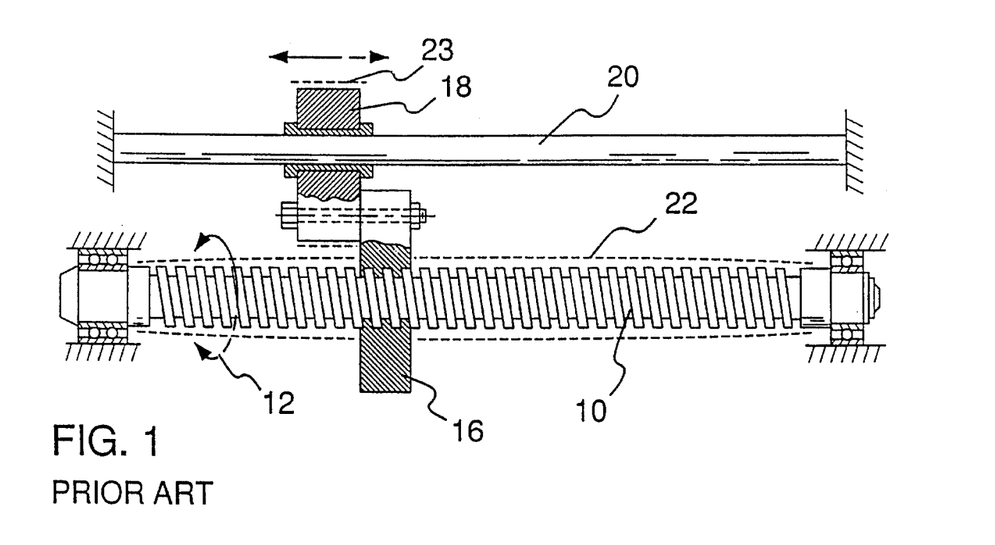
FIG. 1 is a side elevation view, partly in cross-section, showing a prior-art type of conventional lead screw which is rotatably driven and has a nut secured against rotation to a slidably movable object or workpiece.

As shown in FIG. 1, a conventional lead screw setup includes a lead screw 10 having fixed end supports, not shown, driven in rotation as shown by an arrow 12. A nut 16 is threadedly supported on the lead screw and drivingly attached to a workpiece or other object 18 which is slidably supported on a slide 20 for movement longitudinally of the lead screw, which prevents nut 16 from rotating.

Because the lead screw has both substantial length and substantial weight it is subject to lateral deflection as shown by dotted lines 22. The resulting wobble or vibration of the lead screw introduces small but significant errors 23 into the positioning of the workpiece 18.

Another source of error in the mechanism of FIG. 1 arises from backlash. As is well known, that problem may be minimized by employing an additional drive coupling (not shown in FIG. 1) which resiliently opposes the linear driving force that is applied to the workpiece by the nut 16.

Figure 2:
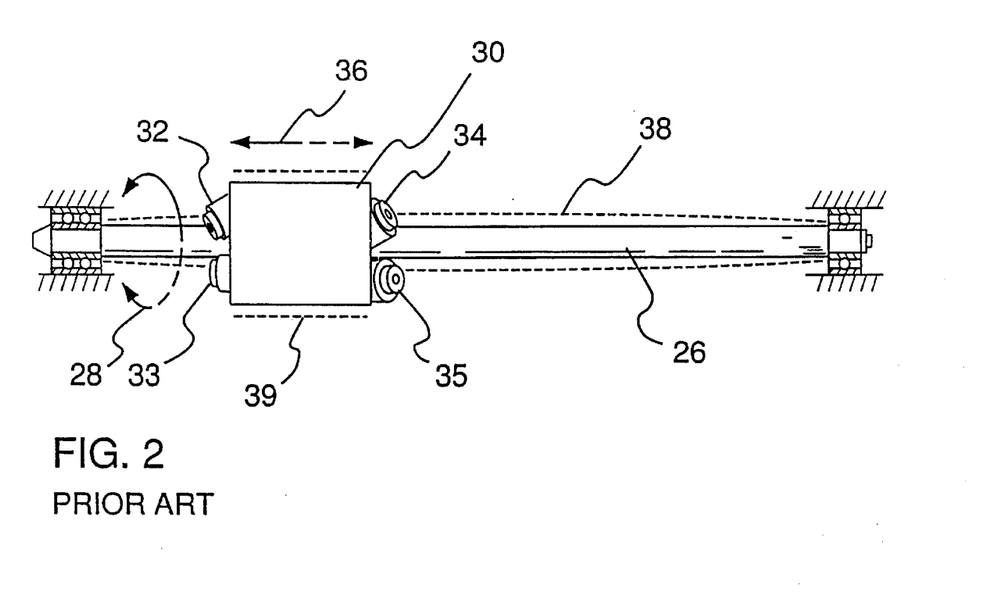
FIG. 2 shows a prior-art linear actuator including a smooth elongated shaft and angled rollers which achieve a driving action by surface friction.

FIG. 2 shows a linear actuator in accordance with the prior art, including a smooth shaft 26 which is driven in rotation as shown by arrow 28. A roller housing 30 is supported by angled rollers 32, 33, 34, 35 which frictionally engage the shaft 26.

The operation is very similar to that of the conventional lead screw; that is, rotation of either the shaft or the housing will drive the other in longitudinal motion, as indicated by arrow 36. Lines 38 indicate that wobble occurring in the shaft 26 creates an error 39 in the housing position.

Figure 3A:
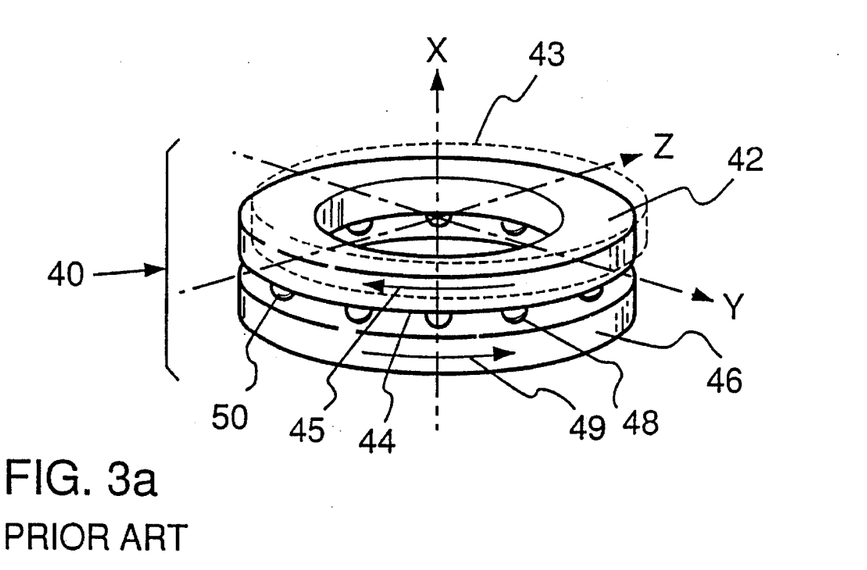
FIG. 3a is a perspective view.

FIG. 3a illustrates a magnetic thrust bearing of a type which has been previously disclosed in U.S. Pat. No. 3,011,842 to Norris. The bearing 40 includes a first ring-shaped magnetic member 42 having an inner surface 44 and a second ring-shaped magnetic member 46 having an inner surface 48.

The two magnetic members are arranged such that their inner surfaces are in generally parallel relationship, and balls 50 are positioned between the two surfaces and aligned in an annular configuration. Balls 50 are made of magnetic material. An arrow 45 indicates that the first or upper ring 42 may rotate in a circular path in a clockwise direction as viewed from above, and an arrow 49 indicates that the second or lower ring 46 may rotate in the opposite direction.

Figure 3B:
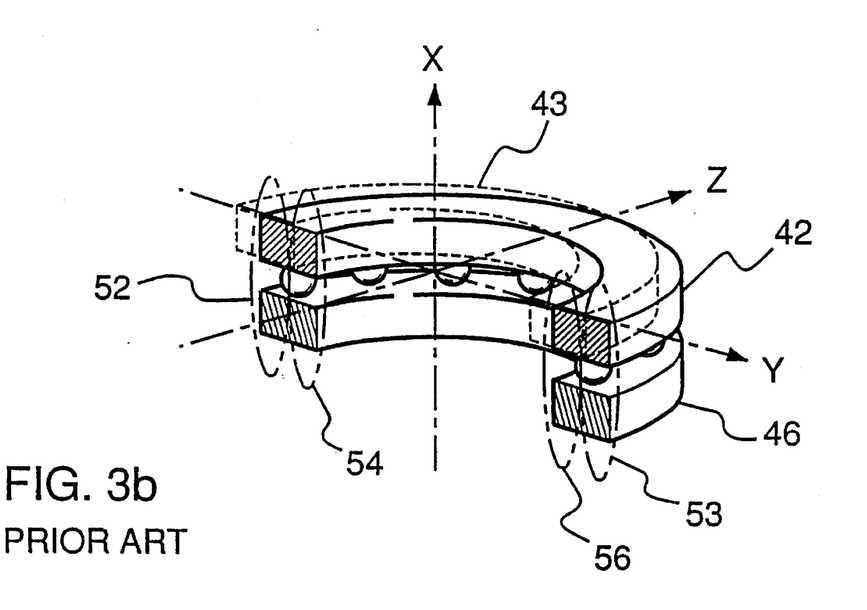
FIG. 3b is a cross-sectional view.

The magnetic members 42, 46, are not only magnetizable, but are in fact permanent magnets. As shown in FIG. 3b, lines of magnetic flux 52, 54, 56, 58 extend through various balls in a direction perpendicular to the circular path of movement of the balls, and loop upon themselves both outside and inside the ring-shaped members.

Figure 4:
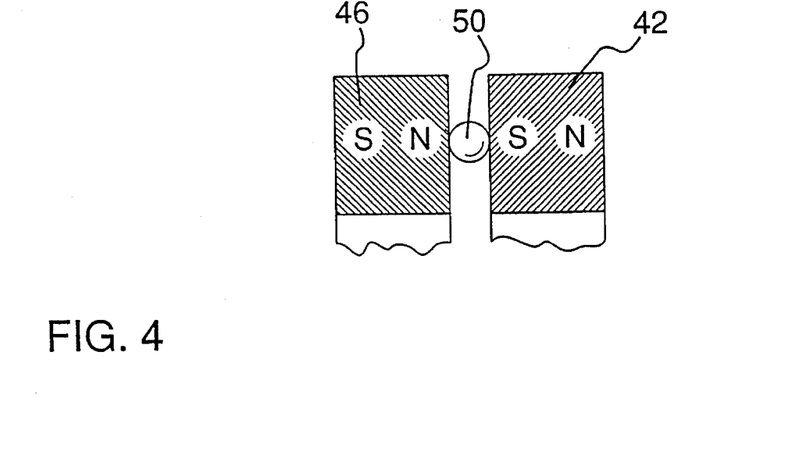
FIG. 4 is a schematic fragmentary view which shows magnetic polarizations of the bearing members.

As indicated in FIG. 4 the adjacent surfaces of the rings 42, 46 are oppositely polarized, one being of north polarity and the other south. The magnetic attraction therefore retains the balls in their annular or circular pattern, and at the same time holds the rings 42, 46 in tight engagement with the balls.

Letters X, Y, and Z have been placed on FIG. 3a. The letter X indicates the axial direction in which thrust may be transmitted through the bearing 40. The letters Y and Z indicate lateral or radial directions which are perpendicular to the axial direction and to each other.

SUMMARY OF THE INVENTION

According to the invention the wobbling action of a drive member is permitted to continue, but its adverse effects upon a workpiece or other movable object are substantially eliminated. A magnetic coupling is inserted longitudinally within the drive train and absorbs the lateral deflections of the drive source, but transmits longitudinal movements in a reliable and precise manner.

More specifically, an object or workpiece is mounted for motion along a drive direction. Magnetic means are employed to couple the driven member to the movable object or workpiece.

In one main aspect, or group of embodiments, of the invention, the magnetic coupling means include a first magnetizable member having a substantially flat annular surface, a second magnetizable member having a substantially flat annular surface positioned substantially parallel to the surface of the first magnetizable member, and a set of balls disposed between the annular surfaces of the two magnetizable members in a generally annular arrangement. The two magnetizable members are secured to respective ones of the drive members.

The two magnetizable members are drawn together by magnetic force, as for example by magnetization of either member or both, to capture and forcibly constrain the balls, with respect to longitudinal motion, between the two members. With respect to transverse motion, however, the balls are free for transverse rolling movements in response to transverse relative displacements of the annular surfaces.

Accordingly the first and second magnetizable members forcibly transmit longitudinal motion from the drive means through the balls to the object. Yet the two members are free for transverse relative displacements because such displacements are accommodated (without the slightest loss of longitudinal engagement) by the transverse rolling motion of the balls. As a consequence, forcible transmission of longitudinal motion from the driven member through the balls is substantially unaffected by lateral wobbling or vibration in the drive.

What is more, the magnetic force can be made strong enough to maintain the two members forcibly engaged even during reversals of the mechanism. During such reversals, conventional systems are subject to an objectionable operating dead zone, sometimes called "backlash", because of a need to take up the slack or play between elements before the mechanism can drive in the opposite direction. Here, there never is slack or play to be taken up.

Furthermore all these advantageous properties persist even in the face of extensive wear, because the magnetic attraction continues, independent of lateral offset, after the parts are worn.

According to a second broad aspect or facet of the invention the magnetic coupling includes first, second, and third magnetizable members. The first and second members have a first pair of opposing annular surfaces between which a first set of balls is disposed in a generally annular arrangement.

The second and third members have a second pair of opposing annular surfaces between which a second set of balls is disposed in a generally annular arrangement. The first and third magnetizable members are secured to respective components of the drive. At least one of the three magnetizable members is magnetized.

In still a third major aspect of the invention, the coupling includes at least first and second mutually facing elements that transmit force along the drive direction while permitting relative lateral motion. A flange is defined on one of the first and second elements, and extends from that element along a direction that includes a component parallel to the drive direction.

In this third main facet of the invention a surface is defined on the other of the first and second elements; the surface is disposed adjacent and parallel to the flange. The flange and surface cooperate to constrain the first and second elements against said relative lateral motion in at least one direction.

A set of balls is positioned between the flange and the surface. This mechanism also includes some means for establishing a magnetic field to attract the flange and surface toward each other, and forcibly clamp the balls between them, to:

eliminate play between the flange and surface in a direction perpendicular to the surface, and permit relative motion between the flange and surface in a direction parallel to the surface.

For simplicity, strength, greatest effect of the magnetic force, and ease of manufacture, preferably the flange is defined along an edge of its associated element. Preferably this flange extends from that edge along the drive direction. Further preferably the flange is substantially planar.

It is also preferable that the mechanism include a third element, which is also mutually facing with the second element and which cooperates with the second element to form another flange-and-surface pair. This pair is oriented at an angle to the first pair introduced above.

Such an added stage eliminates play in another direction that is correspondingly at an angle (ideally a right angle) to the above-mentioned play-elimination direction. Operating together, the two stages prevent relative rotation of the first and third elements and so enable transmission of torque and rotary motion through the coupling.

In yet a fourth primary aspect or facet of the invention, the coupling includes at least first and second mutually facing elements. These elements transmit force along the drive direction while permitting motions which are lateral with respect to the drive direction.

These two elements have curved facing surfaces that rotate about at least one transverse axis with respect to each other. The permitted lateral motions include this rotation of the facing elements with respect to each other about the transverse axis.

A set of balls is positioned between the curved surfaces. This mechanism also includes some means for establishing a magnetic field to attract the curved surfaces toward each other, and forcibly clamp the balls between those surfaces. This provision is to eliminate play between the curved surfaces in directions perpendicular to the surfaces, and permit the above-mentioned lateral motions between the curved surfaces in directions parallel to the surfaces.

Very broadly speaking, this fourth aspect of the invention includes two major subgroupings of embodiments. In one of these subgroupings, the mating surfaces of two magnetizable members each have the shape of a truncated sphere, thereby introducing additional degrees of freedom within the drive train that are spherically symmetrical, and which are used to reduce the effect of any twisting movements upon the accurate transmission of axial movement. These spherical surfaces allow one element of the coupling to undergo rotational components of transverse wobble, but do not transmit such motion to the other element.

Embodiments in this first subgrouping have the beneficial quality of absorbing rotational wobble while transmitting force and motion along the drive direction. These embodiments can be augmented by a second stage that is planar, to analogously absorb translational wobble while still transmitting force and motion in the drive direction—but, because the coupling has spherical symmetry, cannot transmit torque through the coupling.

In the other of the two major subgroupings, the two curved surfaces are preferably segments of cylindrical surfaces. These surfaces allow one element of the coupling to undergo a transverse-wobble rotational component in just one dimension—namely, about the axis of the cylindrical surfaces—and a translational component in an orthogonal dimension which is parallel to that axis. Here too, such motions are not transmitted to the other element and so are absorbed within the coupling.

Where desired to analogously absorb transverse rotational and translational wobble in the complementary directions, a second cylindrical stage is added with the axis of its cylindrical surfaces at an angle, preferably a right angle, to the axis of the cylindrical surfaces in the first stage. This mechanism, like those of the first subgrouping, absorbs both rotational and translational wobble while transmitting force and motion along the drive direction—but unlike those of the first subgrouping can also transmit torque through the coupling.

The axes X, Y and Z marked in FIG. 3a are particularly pertinent when a bearing analogous to the Norris bearing 40 is used as a magnetic coupling means in accordance with the present invention. Dotted lines 43 indicate an alternate position of member 42 in which it is laterally offset in both the Z and the Y directions.

In some preferred embodiments the invention incorporates a rotatable drive mechanism for converting rotating motion to linear motion. This mechanism includes two drive members—one of which is elongated—and which are frictionally interengaged such that driven rotation of either of them causes one to move relative to the other.

The mechanism also includes fixed support means mounting one member for rotation relative to the fixed support while restraining the other member against rotation. The workpiece slides or rolls longitudinally of the elongated drive member.

DRAWING SUMMARY

FIGS. 3a, 3b, and 4 show a type of magnetic thrust bearing which is known in the prior art, and an analogous bearing to which in accordance with the present invention is used as a coupling to accommodate movements in the Y and Z directions.

Figure 5:
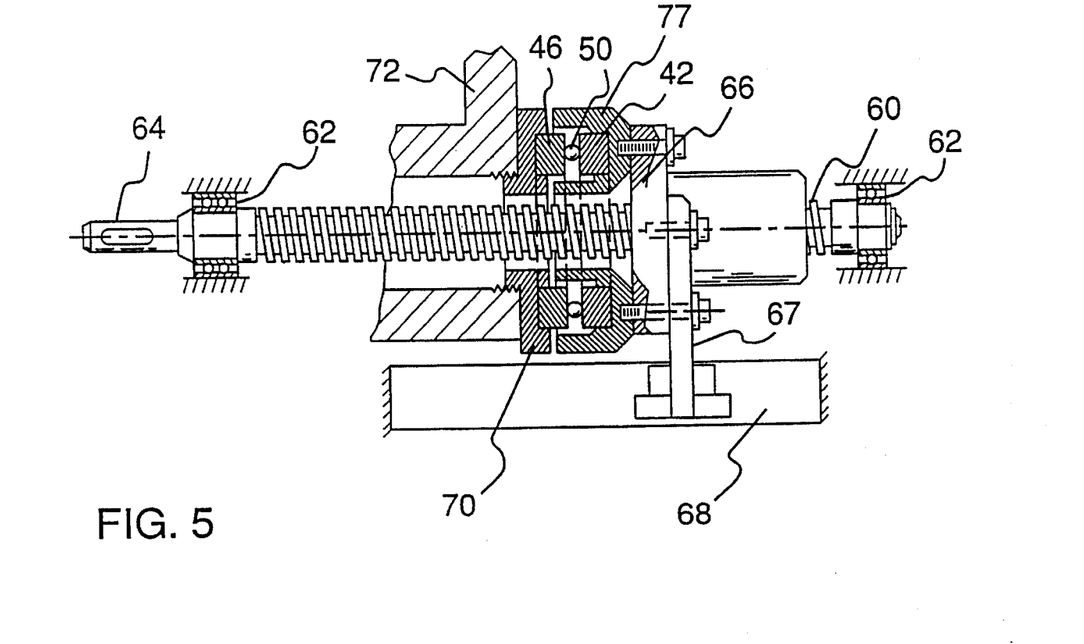
FIG. 5 is a side elevation view, partly in cross-section, of a longitudinal drive apparatus in accordance with a first embodiment of the present invention in which a lead screw rotatably drives a slidably movable object through a magnetic coupling.
Figure 6:
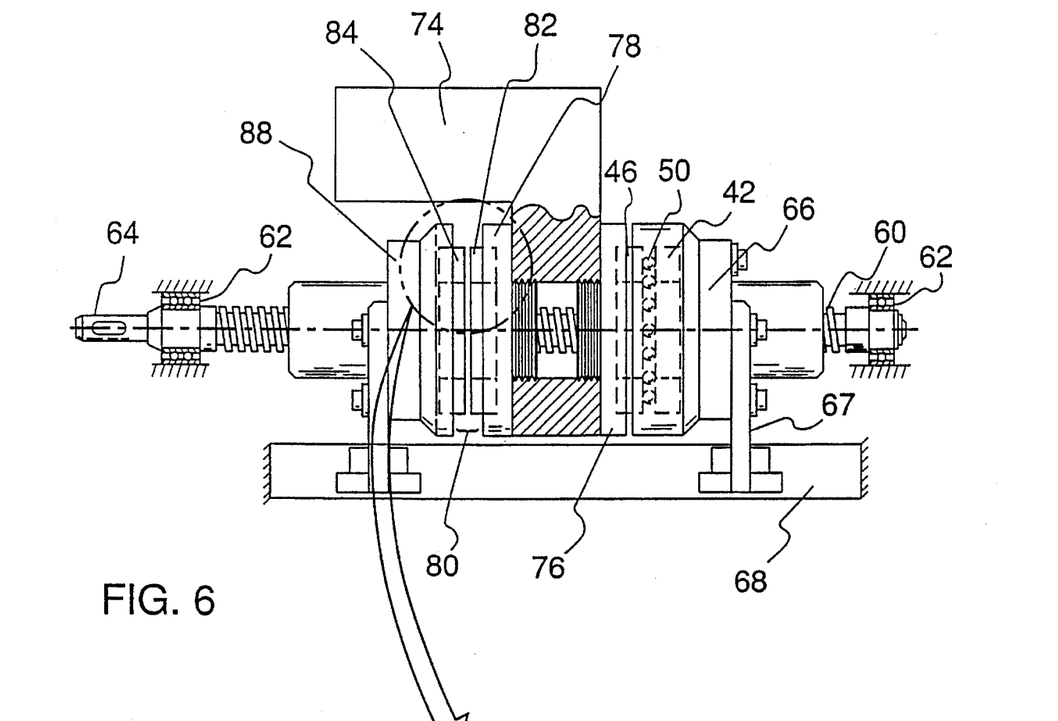
FIG. 6 is a side elevation view, partly in cross-section, of a modified version of the longitudinal drive apparatus of FIG. 5 in which an additional and different magnetic coupling is used to achieve an antibacklash action and help to move the object.
Figure 7:
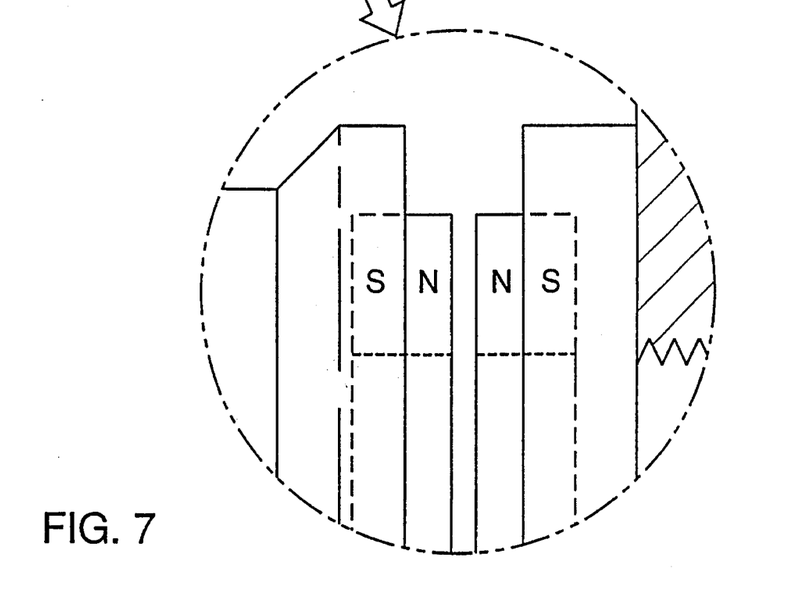
FIG. 7 is a fragmentary schematic view showing the magnetic polarizations of the magnetizable members of the antibacklash coupling of FIG. 6.

DESCRIPTION OF FIRST EMBODIMENT (FIGS. 5, 6 and 7)

FIG. 5 illustrates a longitudinal drive apparatus in accordance with a first embodiment of the invention. A bearing 40 analogous to that of FIGS. 3 and 4 is utilized as a coupling means.

As shown in FIG. 5 a lead screw 60 has fixed end supports 62 and is rotatably driven through shaft end 64. A nut 66 engages the threads of lead screw 60. While a conventional nut is shown, in lieu thereof it may be preferred to utilize the well-known ball-nut assembly, which includes a ball housing disposed about the lead screw but not in direct contact with it, and a plurality of balls retained within the ball housing and engaging a longitudinal section of the screw thread.

A frame 67 is fixedly attached to the near side of the nut 66 and extends downward to and rests upon a horizontal slide 68, for holding the nut against rotation. The slide then guides the nut in a direction that is longitudinal of the lead screw 60. First magnetic member 42 and second magnetic member 46 capture balls 50 therebetween. A workpiece holder 70 is fixedly supported from the second magnetic member 46 and in turn provides fixed support for a workpiece or other movable object 72.

The workpiece 72 preferably is slidably supported upon a horizontal slide, not shown, for guiding it in a direction longitudinal of the lead screw 60.

In operation, the rotation of lead screw 60 driven by the shaft end 64 causes the nut 66 to advance longitudinally of the lead screw. Nut 66 is to some extent supported and guided by the frame 67 which rides upon the horizontal slide 68; perhaps more importantly, however, the frame 67 and slide 68 prevent the nut from rotating, so that it must advance longitudinally of the lead screw. Magnetizable member 42 is fixedly attached through a shroud 77 to the nut 66 and moves with it.

Any lateral deflection or wobble of the shaft 60, therefore, is imparted to the member 42. The workpiece 72 is supported upon its separate slide such as the slide 20 of FIG. 1, and it is therefore almost entirely shielded from the deflections of the magnetizable member 42 in Z and Y directions, and angular movement. That is to say, member 42 moves laterally with respect to member 46 while still transmitting the full amount of axial thrust to it. What is important is that in the movement there is no damage to the ball-nut assembly because all undesired motion is corrected by the magnetic coupling.

It is important to note that control of the movable object may be lost if the force required to move it is greater than the magnetic force between the components in the magnetic coupling. Success can be achieved by choosing magnets having sufficient force, or alternatively by utilizing two magnetic couplings as shown in FIG. 6.

The apparatus of FIG. 6 is essentially the same as that of FIG. 5, with the addition of a second magnetic coupling. Thus, lead screw 60, end supports 62, shaft end 64, first nut 66, frame 67, horizontal slide 68, magnetizable members 42 and 46, and balls 50, are the same as in FIG. 5.

A workpiece or other movable object 74 is supported in part from the magnetizable member 46 by means of a holder 76. On its opposite end, taken longitudinally of the lead screw 60, the workpiece 74 is fixedly attached to a second holder 78. A second magnetic coupling 80 provides axial support for the holder 78.

The magnetic coupling 80 includes a first magnetizable member 82 and a second magnetizable member 84 with opposite vector of magnetic field in the direction of the movement of the magnetizable members. The members 82 and 84 are separated by a short axial space 86, but there are no balls between the members 82 and 84.

Member 82 is fixedly attached to the second holder 78. Member 84 is fixedly attached to a second nut 88 which engages the lead screw 60. The size of the gap 86 should be a little greater than the magnitude of the wobbling action that is to be eliminated.

The magnetizable members 82, 84, are in fact permanent magnets. As shown in FIG. 7, the adjacent surfaces of the members 82, 84, are of like magnetic polarity, so that they repel each other. This action causes the interengaged threads of nut 66 and lead screw 60 to be constantly biased in one axial direction, a technique which is well known for anti-backlash devices.

The biasing force is produced by the magnetic field between the two magnets 82, 84, and is resilient in nature. Thus, the second magnetic coupling has two separate functions: to always push the movable object toward nut No. 1 and the first magnetic coupling; and to hold both the first nut 66 and the second nut 88 with zero backlash relative to the lead screw.

Figure 9:
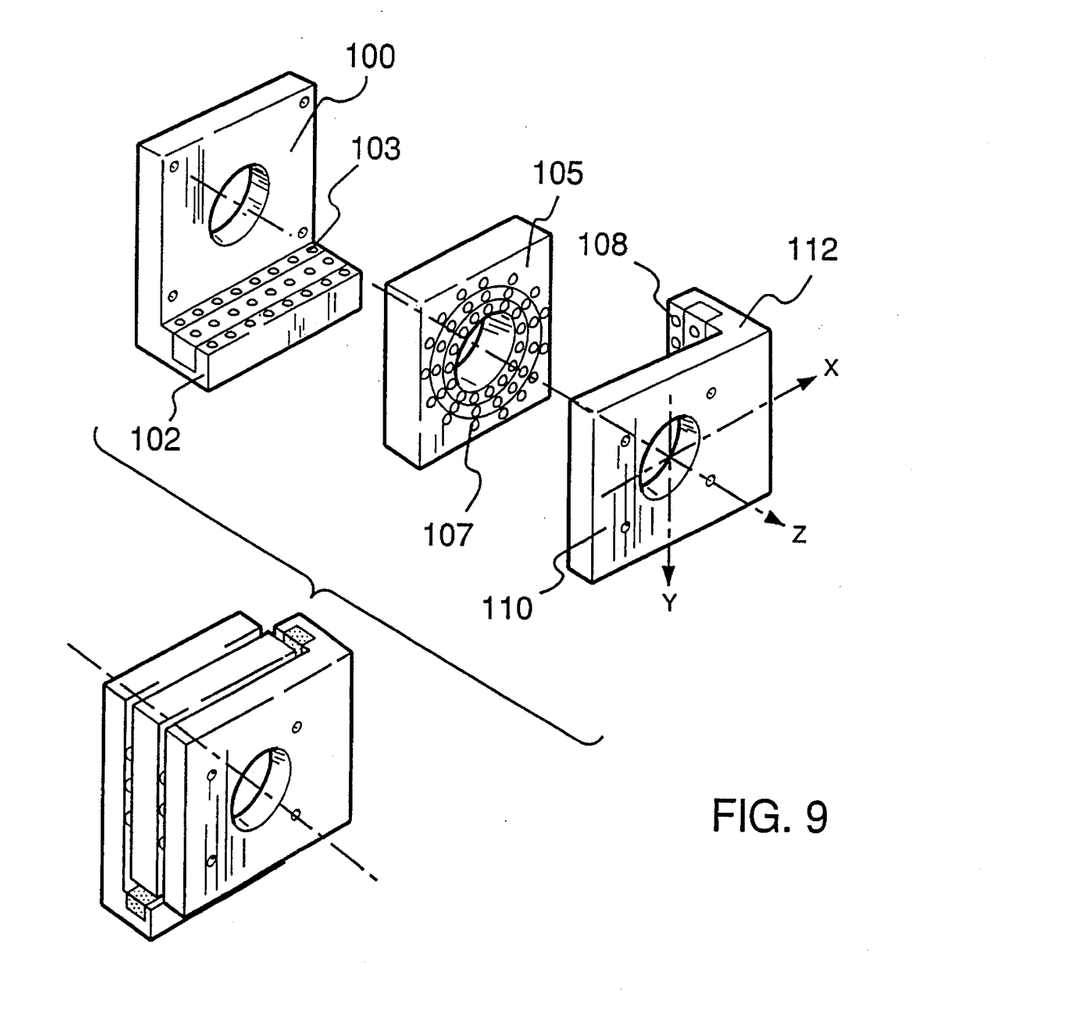
FIG. 9 is an exploded perspective view of a magnetic coupling in which three magnetizable members are utilized, the members being in the form of rectangular plates with interlocking flanges.
Figure 10:
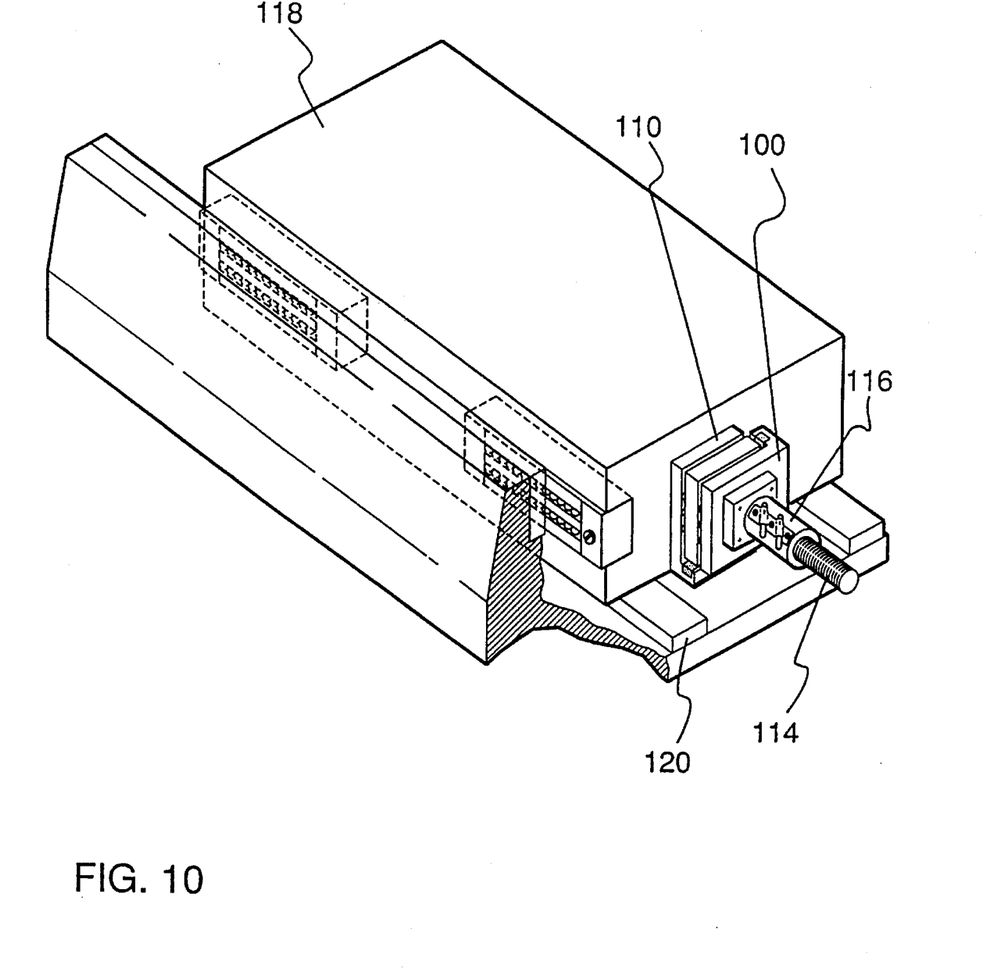
FIG. 10 is a perspective view of a longitudinal drive apparatus in which the magnetic coupling of FIG. 9 is incorporated.

DESCRIPTION OF SECOND EMBODIMENT (FIGS. 9 and 10)

FIG. 9 illustrates a magnetic coupling which includes three magnetizable members 100, 105, and 110, each in the form of a rectangular plate. For use with a lead screw, each plate may have a central opening through which a lead screw may pass. Member 100 on one of its edges has a perpendicular flange 102. Member 110 on one of its edges has a perpendicular flange 112.

In their assembled relation a first set of balls 103 is positioned between the flange 102 of member 100 and a side edge of member 105; a second set of balls (not shown) is positioned between opposing flat surfaces of members 100 and 105. A third set of balls 107 is positioned between opposing flat surfaces of members 105 and 110; and a fourth set of balls 108 is positioned between the flange 112 of member 110 and a side edge of member 105. As shown in FIG. 10 the members 100 and 110 then fit on opposite sides of member 105 and have their flanges positioned at right angles to each other.

For use in one screw-drive environment, as shown in FIG. 10 a lead screw 114 passes through the central openings of the members 100, 105, 110. A ball nut 116 engages the lead screw and fixedly attaches to member 100.

A housing 118 is slidably reciprocably mounted on a support, for example machine table 120; the housing is fixedly attached to the coupling member 110. The interlocking flanges 102, 112 are magnetically biased through balls against the coupling part 105. This coupling design thus prevents rotation of the driving member 100 that is attached to the ball nut.

DESCRIPTION OF THIRD EMBODIMENT (FIGS. 11 through 16, and FIG. 8)

Figure 11:
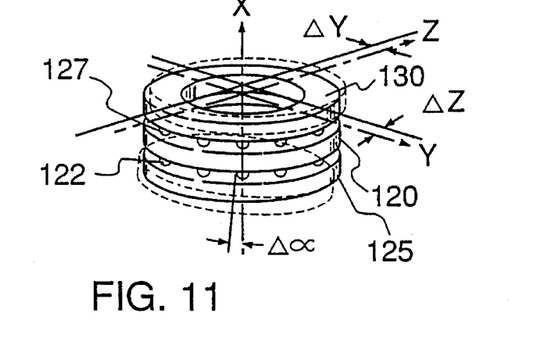
FIG. 11 is a perspective view of another modified form of magnetic coupling utilizing three ring-shaped magnetizable members.
Figure 12A:
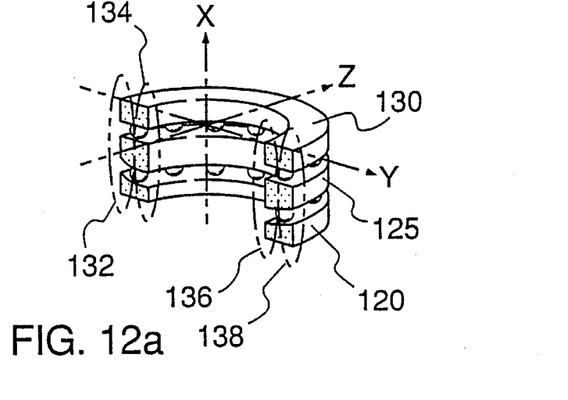
FIG. 12a is a cross-sectional view of the coupling of FIG. 11.

FIGS. 11 and 12a show a magnetic coupling that includes three ring-shaped magnetizable members 120, 125, 130. A first set of balls 122 is positioned between the members 120, 125, and a second set 127 is positioned between members 125, 130.

As best seen in FIG. 12a, the upper surface of member 120 is concave while the lower surface of member 125 is convex. Their curvatures (and those in FIGS. 8, 12b and 12c discussed below) are preferably such as to conform to partial spherical surfaces, but the opposed surfaces of the two upper elements 125, 130 are planar. Hence while the lower stage of the coupling can absorb lateral components of rotational wobble or twist, the upper stage can absorb lateral translational components.

Such a coupling transmits force along the drive direction or X axis, but cannot transmit torque about that axis. The coupling also absorbs torque, through relative rotation of the three elements about that axis (their centerline).

FIG. 12a also indicates that all three of the members 120, 125, 130 are made of magnetizable material and are, in fact, magnetized as permanent magnets. Accordingly, magnetic fields are generated as indicated by the flux lines 132, 134, 136, and 138.

All of these flux lines pass through the annular arrays of balls 122, 127. It will therefore be understood that the members 120, 125, 130, and associated sets of balls, are strongly held together in the direction of desired motion— i.e., the axial direction— by the force of the magnetic fields.

Figure 12B:
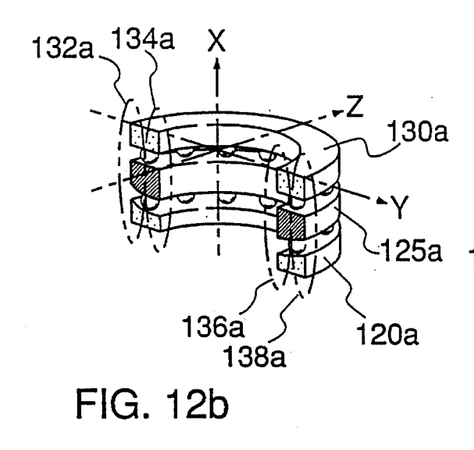
FIG. 12b is a cross-sectional view of a modified form of the coupling of FIG. 11.

FIG. 12b shows a modified form of the magnetic coupling of FIG. 11. As indicated by that drawing, the central member 125a is made of a steel alloy, a material with high magnetic permeability, while members 120, 130 are permanent magnets as before. The magnetic field pattern is essentially the same as for the FIG. 12a apparatus.

Figure 12C:
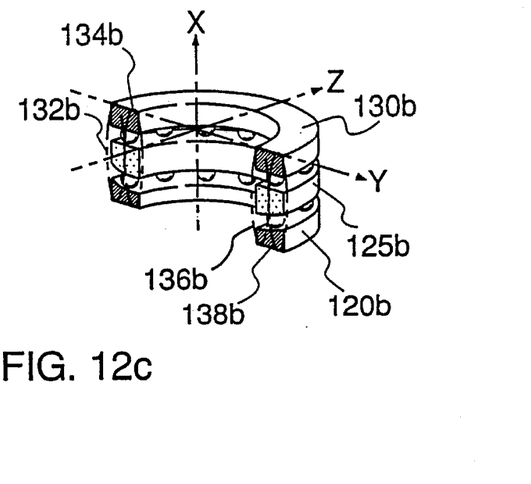
FIG. 12c is a cross-sectional view of another modified form of the coupling of FIG. 11.

FIG. 12c shows a further modified form of the magnetic coupling of FIG. 11. The central member 125 is a permanent magnet as before, while members 120a, 130a are made of a steel alloy material. There is a substantial change in the magnetic field pattern, and the flux lines 142, 144, 146, and 148 are of much smaller scope than the corresponding flux lines as shown in FIG. 12a.

In all of the magnetic coupling designs the balls can be made of nonmagnetic materials. Furthermore, as the present discussion of FIGS. 12b through 13 will make clear to those skilled in the art, the individual coupling members can be made of materials that are magnetically permeable but unmagnetized—provided that some element or elements of the system supply sufficient magnetic flux.

Figure 13:
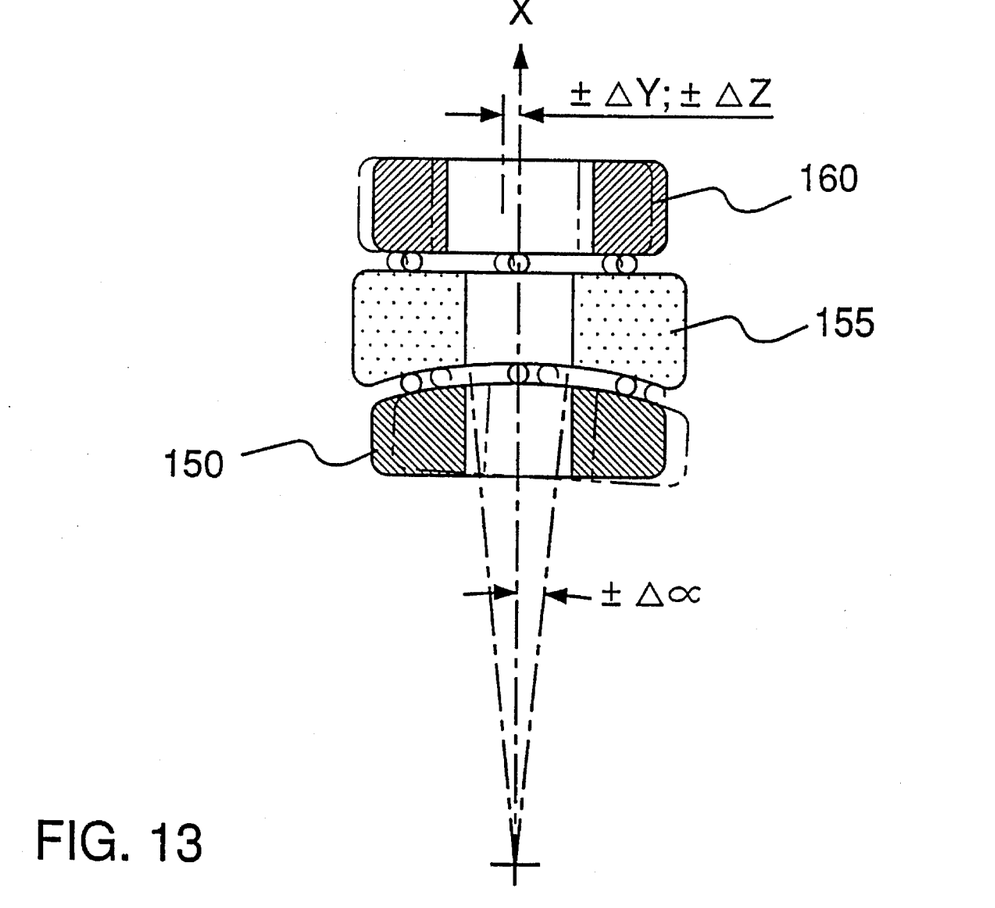
FIG. 13 is a cross-sectional view of still another modified form of magnetic coupling utilizing three magnetizable members, and in which the mating surfaces of two of the magnetizable members each have the shape of a truncated sphere.

FIG. 13 illustrates another modification of magnetic couplings in accordance with the present invention. The coupling includes ring-shaped magnetic members 150, 155, and 160.

Member 150 has a convex upper surface while member 155 has a convex lower surface. The upper surface of member 155 is flat and the mating lower surface of member 160 is also flat. Hence this coupling, like those of FIGS. 11 and 12, tends to absorb lateral translation and rotation (and torque), but can transmit force along the drive direction (X axis).

The central member 155 is magnetized as a permanent magnet while the outer members 150, 160, are not. As shown in the drawing the diameter of the central member 155 is significantly greater than the diameters of the other two members. As a preferred range, its diameter is from 1.2 to 1.5 times the diameter of the two outer members. This feature of the construction permits a significant twisting action relative to the longitudinal axis of the drive train, but with a reduced amount of force in the Y and Z— or lateral—directions to be transmitted to the driven member.

Figure 8:
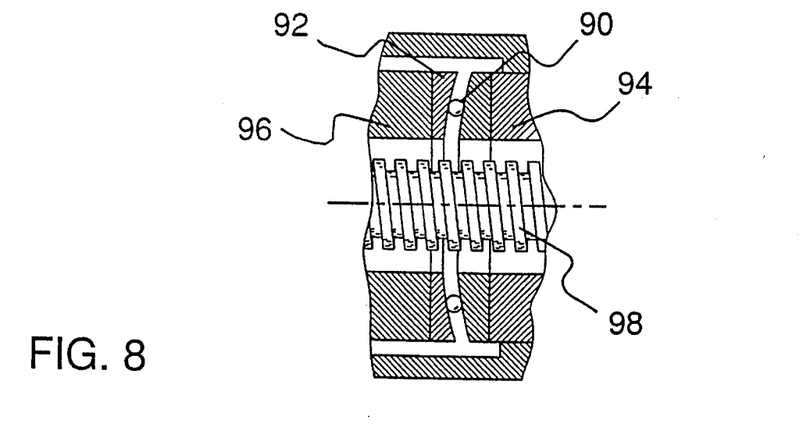
FIG. 8 is a fragmentary cross-sectional view of a modified magnetic coupling in which two magnetizable members have mating dish-shaped surfaces.

FIG. 8 shows a magnetic coupling in accordance with the invention in the screw-drive context. Two magnetizable members have mating dish-shaped surfaces. A first magnetizable member 90 is ring-shaped and has a convex surface facing toward the concave surface of second magnetizable member 92.

A drive member 94 is fixedly secured to member 90 and a drive member 96 is fixedly secured to member 92. Both of the magnetizable members 90, 92, are radially spaced from a lead screw 98 which is drivingly coupled to one of the drive members 94, 96, by means not specifically shown.

The mechanism of FIG. 8 has significant advantages. Axial drive is effectively transmitted, and the influence of any twisting movements that occur in the drive train is greatly reduced.

Figure 14:
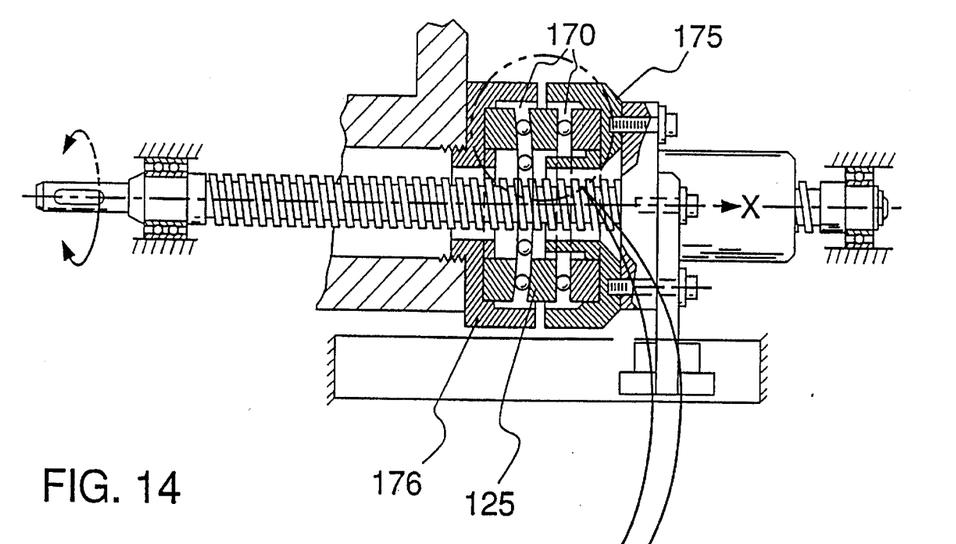
FIG. 14 is a side elevation view, partly in cross-section, of another longitudinal drive apparatus which incorporates the magnetic coupling of FIG. 11.
Figure 15:
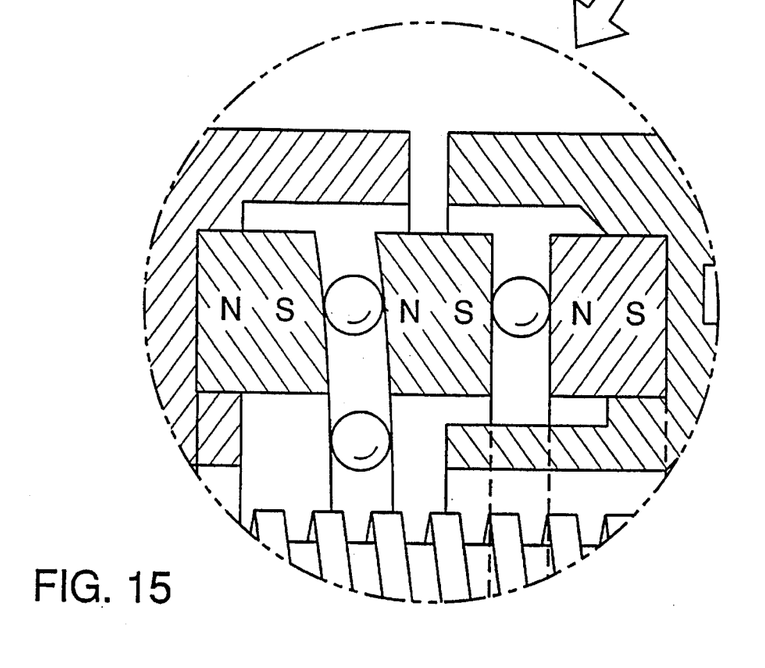
FIG. 15 is a schematic fragmentary view showing the magnetic polarizations of the magnetizable members of FIG. 14.

FIGS. 14 and 15 illustrate a longitudinal drive apparatus which is similar to that shown in FIGS. 5 and 8, an important difference being that the magnetic coupling 170 is of the two-stage type shown in FIGS. 11 and 12a. The magnetic members are substantially enclosed by a pair of shrouds 175, 176 (similar to the shroud 77 in FIG. 5), which are made of magnetic material and therefore provide paths of decreased magnetic reluctance for the flux lines such as 132, 134, 136, 138.

A short length of the central magnetic member 125 is covered by neither shroud. Shroud 175 covers member 130 and a part of member 125, while shroud 176 covers member 120 and a part of member 125. An advantage of this arrangement is that the magnetic coupling is stronger, and at the same time there is less magnetic field strength to be sensed outside the apparatus itself.

Figure 16:
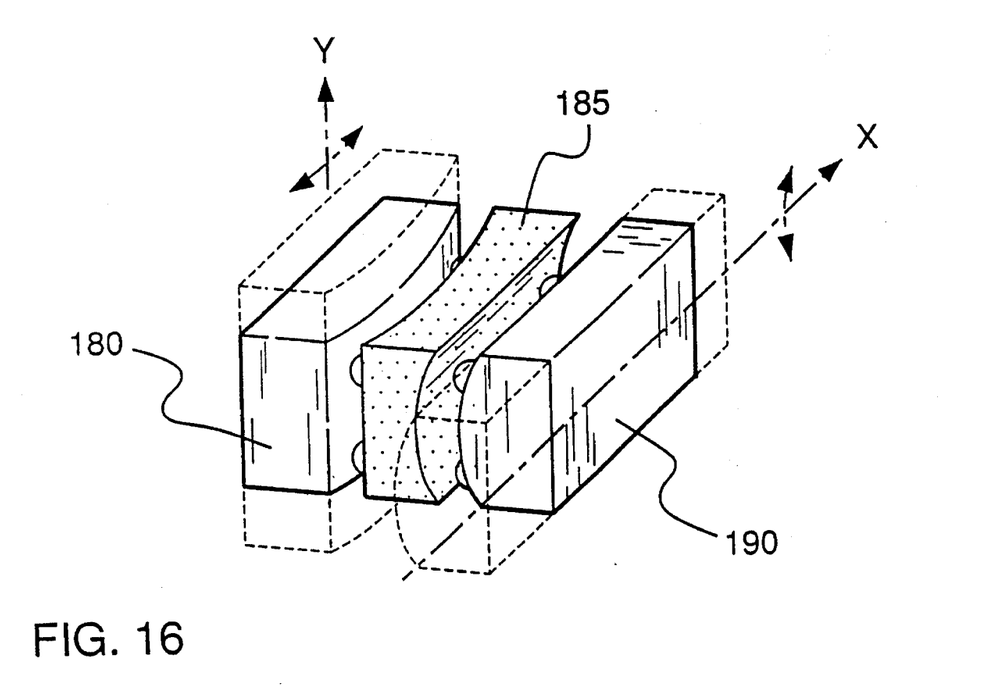
FIG. 16 is a perspective view of a three-part magnetic coupling in which both pairs of magnetizable members have opposed surfaces which are curved, and their curvatures are relative to axes that are mutually perpendicular.

DESCRIPTION OF FOURTH EMBODIMENT (FIG. 16)

FIG. 16 shows a further modification of the magnetic coupling of the present invention. It includes outer plates 180, 190, a central or inner plate 185, and two sets of balls, one on each side of the inner plate. Each mating surface between the inner plate and one end plate is curved in the form of a respective partial cylinder about an axis that is perpendicular to the axis of the coupling. Each mating surface between the inner plate and the other end plate is also curved in the form of a respective partial cylinder about an axis that is perpendicular to the axis of the coupling; and its axis of curvature is perpendicular to the first axis of curvature.

Bars, shafts, an object to be driven, or other elements (such as a screw-drive screw or nut, friction-drive shaft or roller set, etc.)—not shown—typically are secured to the end plates 180, 190 and extend to right and left in FIG. 16. Such elements transmit force or torque, or both, through the coupling along a drive direction perpendicular to the X and Y axes shown, while absorbing transverse rotational and/or translational wobble.

The embodiment of FIG. 16, like all previous embodiments, minimizes wear of the apparatus as well as providing high precision operation, over a relatively greater range of motion.

It will be apparent to those skilled in the art that many other modifications may be made by combining various ones of the features illustrated herein, and there are also modifications which will be evident from the described concepts of the invention.

The invention has been disclosed in detail in order to comply with the requirements of the patent laws. The scope of the invention, however, is to be measured only in accordance with the appended claims.

What I claim is:

1. A drive mechanism for producing linear motion of an object, comprising:

a driven member;

a coupling having two ends secured respectively to the driven member and to the object, the coupling including at least first and second mutually facing elements that transmit force along the drive direction while permitting relative lateral motion;

a flange defined on one of the first and second elements, and extending therefrom along a direction that includes a component parallel to the drive direction;

a surface defined on the other of the first and second elements, and disposed adjacent and parallel to the flange, for cooperating with the flange to constrain the first and second elements against said relative lateral motion in at least one direction;

a set of balls positioned between the flange and the surface; and means for establishing a magnetic field to attract the flange and surface toward each other and forcibly clamp the balls therebetween to:

eliminate play between the flange and surface in a direction perpendicular to the surface, and permit relative motion between the flange and surface in a direction parallel to the surface.

2. The drive mechanism of claim 1, particularly for use in transmitting torque through the coupling to either prevent rotation at one side of the coupling or transmit rotation through the coupling, as desired; and further comprising:

a third element mutually facing with the second element for transmitting force therebetween along the drive direction while permitting lateral motion therebetween;

a second flange, defined on one of the second and third elements, and extending therefrom along a direction that includes a component parallel to the drive direction;

a second surface, defined on the other of the second and third elements, and disposed adjacent and parallel to the second flange, for cooperating with the second flange to constrain the second and third elements against relative lateral motion in at least one direction;

a second set of balls, positioned between the second flange and the second surface; and means for establishing a further magnetic field to attract the second flange and second surface toward each other and forcibly clamp the balls therebetween;

wherein said two ends of the coupling respectively comprise the first and third elements; and whereby forces transmitted through the second element prevent relative rotation of the first and third elements.

3. The drive mechanism of claim 2, wherein:

the two flanges and the two surfaces are all substantially planar; and the second flange and surface are substantially perpendicular to the first-mentioned flange and surface.

4. The drive mechanism of claim 2, wherein:

the elements are of magnetizable material; and further comprising:

two other sets of balls disposed between the two pairs of elements, respectively; and means for establishing at least one magnetic field for attracting the magnetizable elements to each other to forcibly clamp the two other sets of balls therebetween;

whereby longitudinal play between the elements is substantially eliminated while transverse rolling motion of the balls between the surfaces accommodates lateral displacements between the first and third elements.

5. The drive mechanism of claim 2, wherein:

said second flange, defined on said one of the second and third elements, extends from that one element along a direction that is substantially parallel to the drive direction.

6. The drive mechanism of claim 1, wherein:

said flange, defined on said one of the first and second elements, extends from that one element along a direction that is substantially parallel to the drive direction.

7. The drive mechanism of claim 1:

further comprising a driving member which engages the driven member to cooperatively produce longitudinal motion of the driven member when the driving member rotates; and wherein one of the driving and driven members is elongated.

8. The drive mechanism of claim 7, wherein:

a hole is defined through each of the elements respectively; and the elongated member extends through the respective hole in each element.

9. The drive mechanism of claim 1, wherein:

the elements are of magnetizable material; and further comprising:

at least one other set of balls disposed between the first and second elements; and means for establishing at least one magnetic field for attracting the magnetizable elements to each other to forcibly clamp the other set of balls therebetween;

whereby play between the elements, along the drive direction, is substantially eliminated while transverse rolling motion of the balls between the surfaces accommodates lateral displacements between the first and third elements.

10. The drive mechanism of claim 1, wherein:

the means for establishing a magnetic field comprise permanent magnetization of at least one element of the coupling.

11. The drive mechanism of claim 1, wherein:

at least one element of the coupling is of material with high magnetic permeability but is not permanently magnetized.

12. The drive mechanism of claim 1, wherein:

the balls are of nonmagnetizable material.

13. A drive mechanism for producing linear motion of an object along a drive direction, comprising:

a driven member;

a coupling having two ends secured respectively to the driven member and to the object, the coupling including at least first and second mutually facing elements that transmit force along the drive direction while permitting relative motions which are lateral with respect to the drive direction;

wherein the first and second mutually facing elements have curved facing surfaces that rotate about at least one transverse axis with respect to each other; and said permitted lateral motions comprise this rotation of the facing elements with respect to each other about said at least one transverse axis;

a set of balls positioned between the curved surfaces; and means for establishing a magnetic field to attract the curved surfaces toward each other and forcibly clamp the balls therebetween to:

eliminate play between the curved surfaces in directions perpendicular to the surfaces, and permit said lateral motions between the curved surfaces in directions parallel to the surfaces.

14. The drive mechanism of claim 13:

further comprising a driving member which engages the driven member to cooperatively produce longitudinal motion of the driven member when the driving member rotates; and wherein one of the driving and driven members is elongated.

15. The drive mechanism of claim 13, wherein:

the curved facing surfaces are formed substantially as portions of cylinders having a common axis;

said at least one transverse axis comprises said common axis of the curved surfaces; and the permitted lateral motion between the curved surfaces comprises:

relative linear displacement substantially parallel to said common axis of the curved facing cylindrical surfaces, and relative rotation of the curved facing surfaces about said common axis.

16. The drive mechanism of claim 15, particularly for use in transmitting torque or longitudinal force, or both, through the coupling while absorbing relative twisting motion at opposite ends of the coupling; and further comprising:

a third element mutually facing with the second element;

wherein the second and third mutually facing elements have curved facing surfaces that rotate about at least one axis with respect to each other; and these curved facing surfaces too are formed substantially as portions of cylinders having a second common axis; and this second common axis of the second and third elements is at an angle to the previously mentioned common axis of the first and second elements;

another set of balls positioned between the curved facing surfaces of the second and third elements; and means for establishing a magnetic field to attract the second and third elements toward each other and forcibly clamp this other set of balls therebetween;

wherein said two ends of the coupling respectively comprise the first and third elements.

17. The mechanism of claim 16, wherein:

said angle, between said second common axis of the second and third elements and said previously mentioned common axis of the first and second elements, is substantially a right angle.

18. The drive mechanism of claim 13, particularly for use in transmitting force through the coupling along the drive direction while absorbing relative twisting motion at opposite ends of the coupling; and wherein:

the curved facing surfaces are formed substantially as portions of spheres.

19. The drive mechanism of claim 18, particularly for use in transmitting force through the coupling along the drive direction while absorbing both relative twisting motion and relative lateral wobble at opposite sides of the coupling; and further comprising:

a third element, mutually facing with the second element;

wherein the second and third mutually facing elements have planar facing surfaces that are free for lateral linear motion with respect to each other;

another set of balls positioned between the flat facing surfaces of the second and third elements; and means for establishing a magnetic field to attract the second and third elements toward each other and forcibly clamp this other set of balls therebetween;

wherein said two ends of the coupling respectively comprise the first and third elements.

* * * * *